Dec. 28, 1965  J. T. DESSUREAU ET AL  3,225,798
MEANS FOR PROCESSING STONE SAWING WIRES
Filed Nov. 26, 1963  4 Sheets-Sheet 1

INVENTORS
Joseph T. Dessureau
John B. Dessureau

BY
ATTORNEY

Dec. 28, 1965 J. T. DESSUREAU ET AL 3,225,798
MEANS FOR PROCESSING STONE SAWING WIRES
Filed Nov. 26, 1963 4 Sheets-Sheet 2
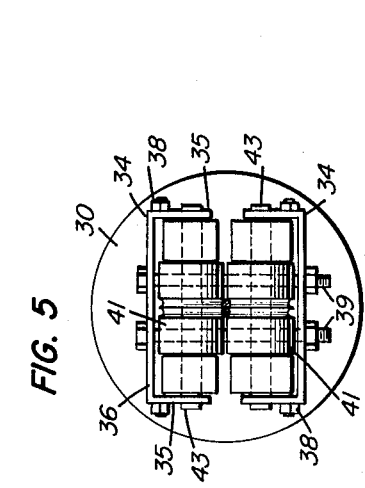
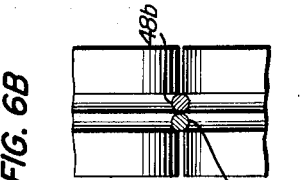
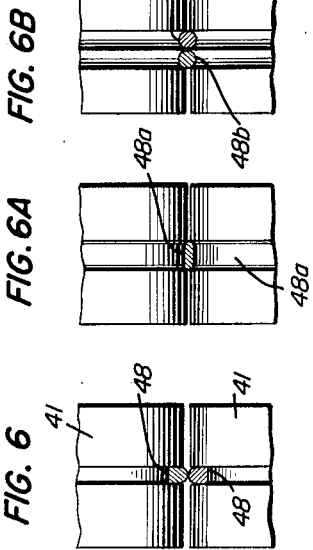
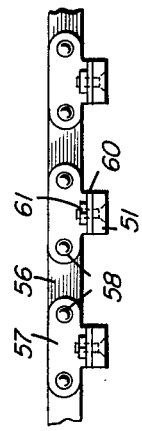
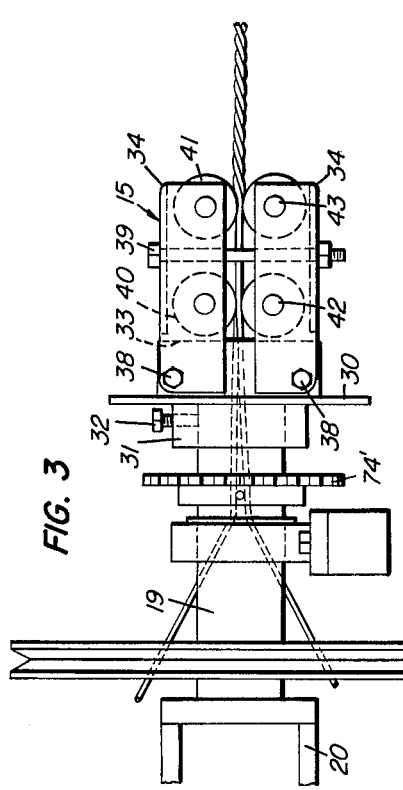
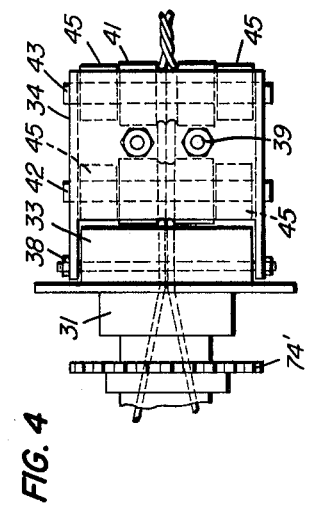
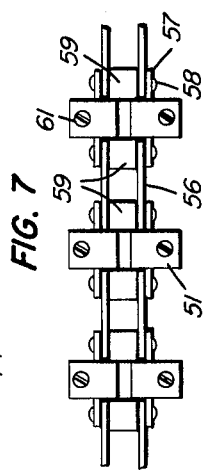
INVENTORS
Joseph T. Dessureau
John B. Dessureau
BY
ATTORNEY Dec. 28, 1965   J. T. DESSUREAU ET AL   3,225,798
MEANS FOR PROCESSING STONE SAWING WIRES
Filed Nov. 26, 1963   4 Sheets-Sheet 4
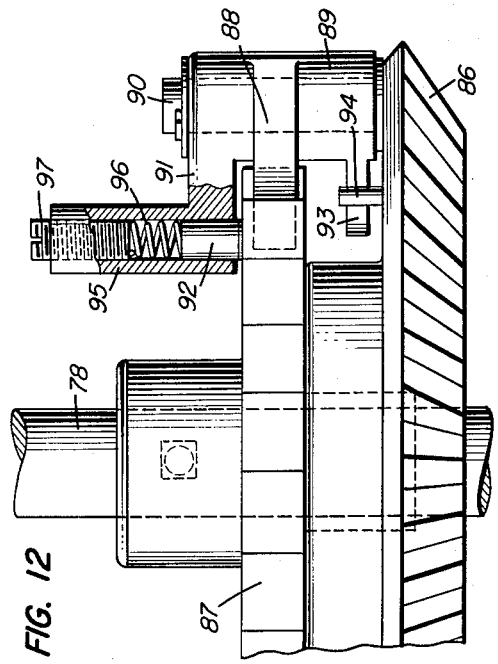
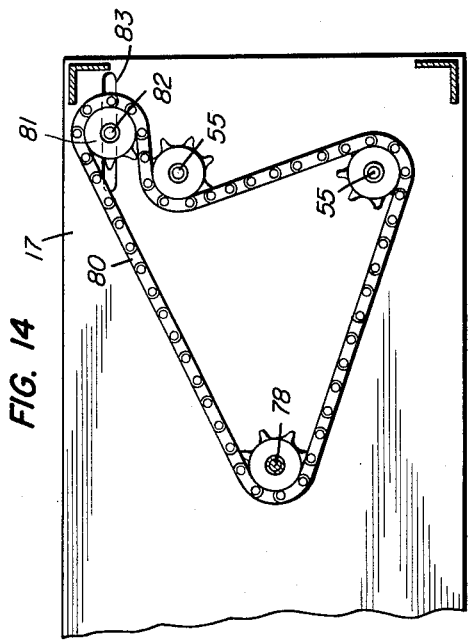
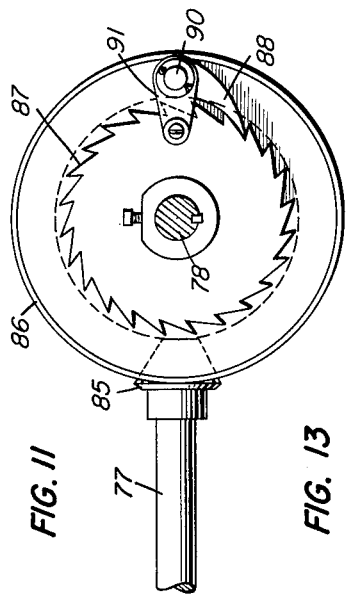
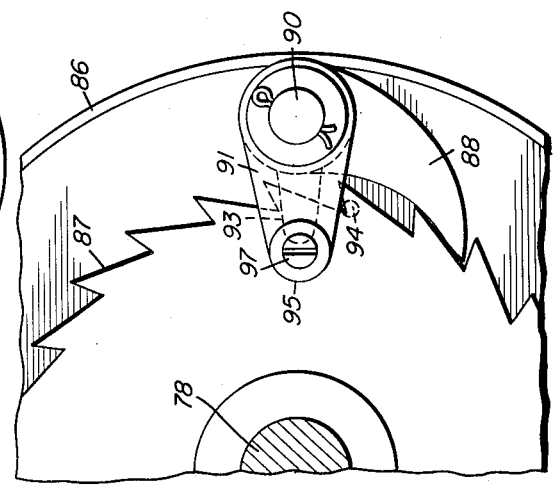
INVENTORS
Joseph T. Dessureau
John B. Dessureau
BY
ATTORNEY

United States Patent Office 3,225,798
Patented Dec. 28, 1965

3,225,798
MEANS FOR PROCESSING STONE
SAWING WIRES
Joseph Theodore Dessureau and John B. Dessureau,
both of 53 Granite St., Barre, Vt.
Filed Nov. 26, 1963, Ser. No. 326,180
6 Claims. (Cl. 140—149)

This invention relates to the manufacture of abrasive wires or cables used in machines for cutting or sawing blocks of granite, marble or other stone, the invention being particularly useful in processing the stone sawing wire of our Reissue Patent No. 24,660 but is not limited thereto.

Stone saws of this type usually consist of either a single flat strand of steel or other resilient metal, that is spirally twisted with the twist reversed at intervals throughout the endless sawing band, or of two or more resilient strands of circular or other cross sectional shape similarly twisted. The stone sawing wire of said Reissue No. 24,660 is a cable composed of two twisted strands of substantially D-shaped in cross section, that is, each wire is tranversely rounded along one side whereas the other side is of generally rectangular cross sectional shape, the rounded portions of the strands being disposed at the inner part of the cable and the rectangular portions being disposed at the outer portion to increase the efficiency of the saw. The strands are made of very stiff high carbon steel alloy usually $\frac{1}{8}''$ in diameter so that the two wire sawing cable is usually $\frac{1}{4}''$ in diameter but when the sawing wire is composed of a single twisted flat ribbon the diameter is usually $\frac{3}{16}''$, such flat wires being usually used for long stone saws.

In the past difficulty has been found in making twisted stone sawing wires and cables that are straight and free from torsion, that is, from a tendency to whirl or coil due to the inherent resilience in the strand or strands; and it has been common practice to pass the sawing wire or cable through a straightening mechanism, after the twisting operation, in order to remove the torsion or whirl. One of the principal objects of the invention is to provide a machine that will produce a twisted stone sawing wire or cable, which as it leaves the machine, will be straight and free from stress or torsion and will also have a tight and even or uniform twist or pitch which is so necessary for efficient stone cutting.

Another important object of the invention is to provide a new method or process for producing the reversals of the twists in the sawing wires or cables at intervals such as 25′ for short saws and 50′ for long wire saws.

The invention contemplates the use of a suitable motor driven rotary cage or frame carrying one or more spools for the wire strands and mounted on a hollow shaft, the latter carrying a novel twister head with which is very closely associated a capstan of the tractor type for pulling the wires through the machine. The capstan or tractor comprises a pair of opposed sprocket chains carrying spaced pads that grip the opposite sides of the twisted wire or cable in a manner which prevents the strand or strands from having any axial rotation or turning movement. In the rotary twister head are opposed rolls between which the strand or strands move and which also prevent axial turning or rotation of the strands during the twisting operation. Because of the very close association of these two elements of the machine and the fact that each prevents or substantially prevents any axial turning of the strands during the twisting operation, the twist will be tight and uniform and the discharging wire or cable will be straight and substantially free from any tendency to twist since during the twisting operation torque is removed from the strands and they are given a permanent distorsion.

Since an efficient endless stone sawing wire or cable must have the twist reversed at intervals, we have designed the machine so that by manual operations it may be made to produce reversed twists at any desired distances along the saw. The method includes the step of gripping the twisted portion of the wire or cable at a point between the twister head and the tractor, by the jaws of a pair of hand tongs, and holding the gripped portion as the direction of rotation of the twister head is reversed, the gripped portion being held until it has passed through the tractor and the latter is effectively engaged with a new portion that has the reversed twist.

The invention further contemplates in connection with this method of reversing the twist, the use of a single reversible electric motor which drives both the twister head and tractor, together with a manually operated control switch by means of which the motor may be stopped or its armature caused to rotate in either direction, and also a novel automatic reversing mechanism, whereby the tractor chains will always move in the same direction to pull the strand or strands through the machine without regard to the direction of rotation of the twister head. After the machine has twisted in one direction the desired length of sawing wire and it is desired to reverse the twist, the machine may be stopped, a pair of manually operated tongs engaged with the twisted wire between the twister head and the tractor and the switch is then operated to cause the motor to drive the twister head in the opposite direction. The jaws of the tongs have a width less than the spaces between adjoining gripping pads on the tractor chains and the tongs are manually held in engagement with the twisted wire as it passes through the tractor.

With the above and other objects and advantages in view, the invention resides in the novel structure and the novel combinations of elements and procedures hereinafter claimed and hereinafter described in detail in connection with the accompanying drawings which show the present preferred form of the machine and the apparatus useable for practicing the method.

In the drawings:

FIGS. 3, 4 and 5 are respectively top, side and end views of the twister head on an enlarged scale;

Figure 9:
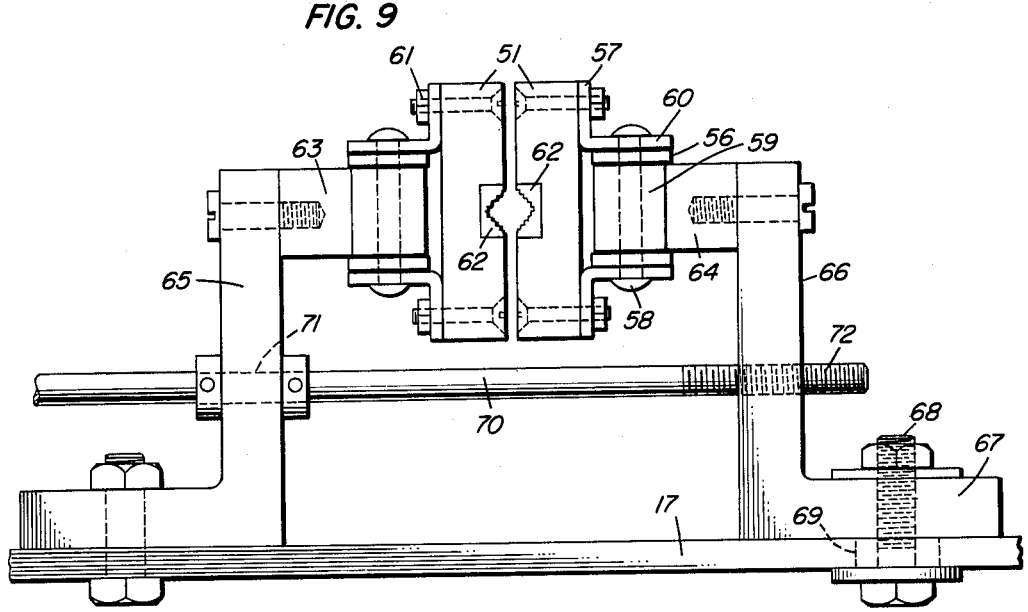
Figure 10:
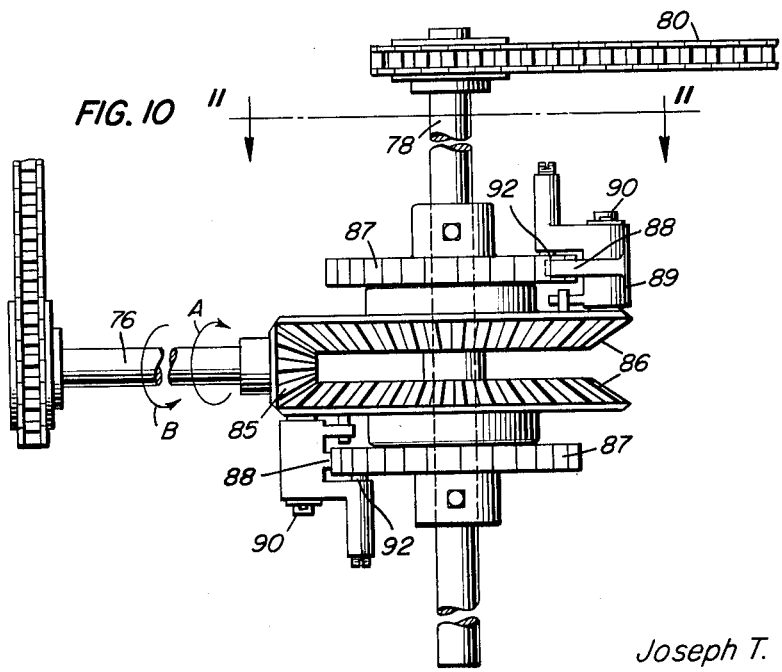

FIGS. 6, 6ª and 6ᵇ show three forms of grooved rolls interchangeably useable in the twister head;

FIGS. 7 and 8 are respectively side and top views of a portion of one of the tractor chains;

FIG. 9 is an enlarged detail vertical transverse section through a portion of the tractor showing the means for applying pressure to the sawing wire strands to prevent them from axially rotating;

FIG. 10 is an enlarged detail side view of the automatic reversing mechanism used for driving the tractor chains;

FIG. 11 is a detail section on line 11—11 in FIG. 10;

FIGS. 12 and 13 are enlarged detail views of the pawl and ratchet device of the reversing mechanism;

FIG. 14 is a detail view showing the sprocket chain drive for the driven shafts of the tractor chains.

Referring more in detail to the drawings the numeral 15 denotes the rotary twister head and 16 the tractor type of capstan which will be termed a tractor. These elements at least are mounted above a suitable support 17 which may be the flat horizontal top plate of a table or bench supported by legs 18 from the floor. The twister head is fixed to one end of a hollow shaft 19 that also has fixed to it the supply carrier 20 which may take various forms. As shown the carrier 20 is an elongated rectangular frame or cage, one end of which is fixed to the shaft 19 and at its other end is a journal 21 in axial alinement with that shaft and mounted in a bearing 22 on a post rising from the floor. A similar journal bearing 23 is provided on the plate 17 for the shaft 19. As shown two wire supply spools 24 are rotatable in the rotary frame 20. The shaft 19 is preferably driven by a belt 25 which passes around a pulley on the shaft of a reversible electric motor 26 and around a spoked pulley 27 fixed to the shaft 19. This tubular or hollow shaft has lateral openings 28 at opposite points so that the wires on the spools may pass into the bore of shaft 19.

As shown more clearly in FIGS. 3, 4 and 5, the twister head 10 comprises a circular mounting flange 30 on one side of which is a tubular hub 31 that may be fixed to shaft 19 by a set screw 32, and on the opposite side of which is a generally rectangular and diametrically extending supporting block or projection 33 with a central opening for the passage for the wire or wires to be twisted. Pivotally mounted on this bearing projection or block 33 are two diametrically opposed roller carrying members 34 that may be adjusted to cause their rolls to apply variable pressure against opposite sides of the wires passing between them. Each of the opposed roller cages or members 34 is of U-shape cross section having side flanges 35 and a connecting portion 36. Projecting ends of the flanges 35 are pivoted on pins 38 in the outer portions of the block 33. In the portions 36 of the two cages are pairs of openings that receive adjusted bolts 39 or other means for forcing the free portions of the two cages 34 toward each other to force the rolls that they carry against opposite sides of the wire or wires passing through the twister head.

It is to be noted that in each of the two cages or members 34 there are two rolls 40 and 41 with their axes 42 and 43 spaced from each other longitudinally of the cages or in the direction of movement of the wire through the twister head. Since the rolls in the two cages are in opposed relation and since the opposed pairs of rolls are spaced a short distance apart in a longitudinal direction, there will be a short length of the wire or wires between the pairs gripped and not only held straight but also prevented or substantially prevented from axially turning or rotating as they are pulled through the rotating twister head. The opposed rolls 40, 40 and 41, 41 are cylindrical and formed with grooves shaped according to the cross sectional shape of the wire or wires to be twisted as will be understood upon reference to FIGS. 6, 6ª and 6ᵇ. The rolls rotate on antifriction roller bearings (not shown) on pins or shafts which form said axes 42, 43. These shafts are removably mounted in the side flanges 36. Also on those shafts 42, 43 and on opposite sides of the rolls are thrust rolls 45 with antifriction ball bearings (not shown). By removing the shafts 42, 43 any of the pairs of grooved rolls shown in FIGS. 6, 6ª and 6ᵇ may be used according to the cross sectional shape of the wire or wires to be twisted. In making a sawing wire of two D-shaped strands it is important that the flat sides of the wires be opposite each other and on the outside of the cable; and in order to obtain that result the rectangular sides of the two wires must have a relatively snug fit in the correspondingly shaped groove 48 of the rolls 41 in FIG. 6. In FIG. 6ª the grooves 48ª similarly hold the single flat ribbon wire during the twisting operation. In FIG. 6ᵇ the rolls have two part-semicircular shaped grooves 48ᵇ for two cylindrical wires. While such grooved rolls will not entirely prevent turning of the two wires, the adjustment of the pinch bolts 39 and the gripping of the wires by the longitudinally spaced rolls 40 and 41 substantially prevents axial turning of the two round wires.

The capstan or tractor 16 comprises two endless sprocket chains 50 which carry V-grooved pads 51. The pads on the opposed reaches of the chains grip opposite sides of the twisted sawing wire or cable. These chains pass around sprocket wheels 52 and 53. The wheels 52 are rotatable on the upper ends of upright shafts or posts 54 that rise from the base plate 17. The wheels 53 are fixed to the upper ends of upright driving shafts 55 which extend through the plate and are mounted in bearings thereon. As shown in FIGS. 7 and 8, each chain comprises inner and outer links 56 and 57 connected by pivots 58 on which latter are rollers 59. The outer links 57 are formed with laterally projecting ears 60. The pads 51 are rectangular metal members the ends of which are fastened by bolts 61 to the ears 60 on opposed outer links. To insure effective gripping action and to reduce wear, the outer faces of the pads are formed with transverse channels in which are fastened carbide steel inserts 62 having V-shaped grooves with serrated surfaces that grip the opposite sides of the twisted wire or cable.

In order to apply pressure on the pads 51 so that the sawing wire or wires will not turn axially or rotate, the chain rollers 59 run along two horizontal pressure bars 63 and 64 one of which is adjustable toward and from the other. These pressure bars extend along the opposed reaches of the chains and the stationary bar 63 is bolted to the upright portion of an angle metal plate 65 that is fastened on top of the plate 17 by two or more bolts. The adjustable pressure bar 64 is also bolted to the upright portion of a similar angle metal plate 66 which is slidably adjustable on the plate 17 as seen in FIG. 9. The lower portion or flange 67 of the plate 66 has threaded openings for two clamping bolts 68 which are slidably adjustable in slots 69 formed in the plate 17. In order to adjust the plate 66, two horizontally spaced screw rods 70 are provided in the upright portions 65 and 66 of the two angle metal plates. These adjusting screw rods 70 pass through holes 71 in the plate 65 and have threaded ends 72 engaged in screw holes in plate 66. The other ends of the adjusting rods 70 have stop collars on opposite side of plate 65, and their extremities are apertured to receive cross bars 73 that serve as handles to rotate the rods. The shafts 54 and 55 are spaced about 2' apart so that a long stretch of the twisted wire or cable will be held in a straight line and in a manner that prevents any axial rotation of the twisted wire or cable being pulled by the tractor.

Figure 1:
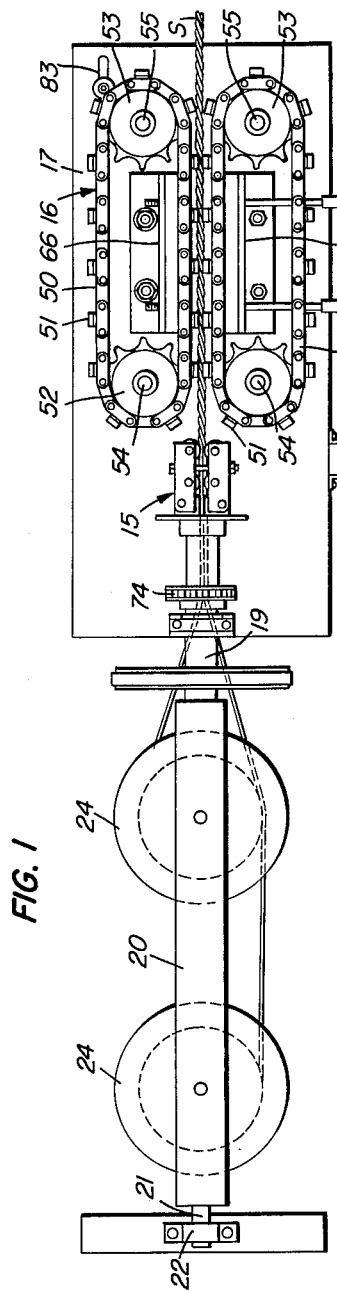
FIG. 1 is a top plan view of the machine.
Figure 2:
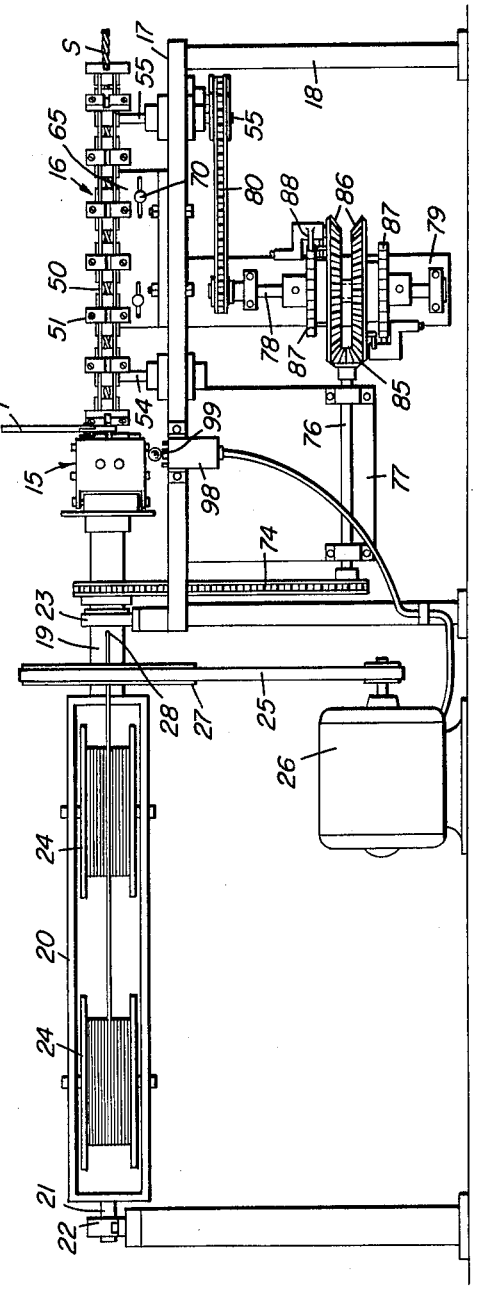
FIG. 2 is a side elevation of the same.

We have discovered that in order to produce a straight stone sawing wire free from torsion or torque as it leaves the machine and with a tight uniform twist, it is necessary to have both the twister head and the tractor hold the wire or wires against any substantial axial rotation and also necessary to have the inlet end of the tractor as close as possible to the twister head. This distance or spacing is critical if a tight and uniform twist is to be obtained, and it should not be more than 2". To have a "tight" twist for a two strand cable the wires must bear against each other; and we have found that the further the twister head and the capstan are from each other the looser the twisted cable will be. We have found that of the twister head just clears the tractor the best results are obtained. FIGS. 1 and 2 show the twisted cable S but they are not scale drawings. The pitch of the twist is determined by the speed of the tractor chains relative to the speed of rotation of the twister head, and it may be from ¾" to 1" more or less. Even though the twister head and the tractor are so closely spaced, the space will be sufficient to permit a pair of hand tongs T to grip the portion of the twisted cable S passing between them, as hereinafter described.

In the illustrated embodiment of the invention we have shown both the twister head and the tractor driven by a single reversible electric motor in connection with a manual control switch and an automatic reverse gear drive for the tractor so that the tractor chains will always travel in the same direction when driven from the twister head shaft. When it is desired to reverse the twist after the desired length of sawing wire has been formed, the drive of the twister head is stopped and then the jaws of a pair of tongs of the crossed pivotally connected hand lever type, are engaged with the twisted wire or cable S between the twister head and the tractor, as indicated at T in FIG. 2. The twister head is then started to rotate in the opposite direction but the chains of the tractor will move in the same direction as before. The tongs T are manually held engaged with the wire or cable as the gripped portion moves through the tractor or at least until the latter has an effective grip upon the advancing reversely twisted portion of the wire or cable. That operation is permitted since the width of the jaws of the tongs is less than the spaces between adjoining pads 51 of the tractor chains. This procedure is repeated whenever it is desired to reverse the twist.

When the tractor 16 is to be driven from the reversible motor 26, power is transmitted from the shaft 19 by sprocket chain drive 74 to a horizontal shaft 76 mounted in bearings on a bracket plate 77 which depends from the supporting plate 17 as shown in FIG. 2, and the automatic reversing mechanism shown in FIGS. 10 and 13, is provided between shaft 76 and a vertical shaft 78 mounted on bearings on another bracket plate 79 depending from the plate 17. The motion of shaft 78 is transmitted by the sprocket chain gearing shown in FIG. 14, to the lower ends of the two shafts 55 carrying the driving sprocket wheels 53 for the tractor chains. As seen in FIG. 14, the chain 80 passes around a sprocket wheel on shaft 78, around sprocket wheels on shaft 55 to rotate them in opposite directions and around a fourth sprocket wheel 81 on shaft 82 which is adjustable in a slot 83 in the plate 17, for the purpose of tightening the chain 80.

The reversing mechanism includes a bevel pinion 85 fixed to the end of shaft 76 and in constant mesh with opposed bevel gears 86 which turn freely on shaft 78. A spacing sleeve is provided on shaft 78 between the gears. Associated with each bevel gear 86 is a ratchet wheel 87 that is fixed to shaft 78 by a key or set screw. Each of the bevel gears carries a swinging pawl or dog 88 that engages the associated ratchet wheel to transmit the motion of that gear to shaft 78. This pawl and ratchet drive is the same for each gear but the bevel or angle of the teeth of the two ratchet wheels is reversed. The pawl 88, as seen in FIGS. 10 and 12, has a hub portion 89 that turns on a laterally projecting pivot pin 90 fixed to the associated gear 86. At one end of the hub 89 is a radial arm 91 disposed opposite one side face of the associated ratchet wheel 87 and carrying a friction element 92 that presses against the side face of the ratchet wheel to cause the pawl to be swung either into or out of engagement with the teeth of the associated ratchet wheel according to the direction of rotation of the latter. At the other end of the hub portion 89 is another radial arm 93 adapted to engage a stop pin 94 fixed to the associated gear 86 to limit the swinging movement of the pawl away from the ratchet wheel. The friction or drag element 92 is a cylindrical plug of friction composition slidable in a tubular projection 95 on the arm 91 and yieldably pressed against the ratchet wheel by a coil spring 96, the tension of which may be varied by adjusting a screw 97 in tubular part 95. In FIG. 10 the uppermost pawl 88 is shown engaged with its ratchet wheel when the shaft 76 rotates in the direction of the arrow A and when shaft 76 is rotated in the opposite direction indicated by the arrow B, the upper pawl will be disengaged and the lower pawl engaged with its ratchet wheel to drive the shaft 78 in the same direction. It will therefore be seen that the sprocket chain 80 and hence the chains of the tractor will always be driven in the same direction without regard to the direction of rotation of the twister head.

As shown in FIGS. 1 and 2, the electric current (the source of which is not shown) is supplied to the reversible motor 26 from a drum type switch 98 that may be mounted on the edge of the plate 17 and that has a control lever 99 movable from a central or OFF position, to either of two side positions to cause the armature of the motor to turn either in one or the other direction.

It is believed the operation of the machine will be apparent from the foregoing detailed description of the preferred form of practicing the invention when the machine is to produce a tightly twisted stone sawing wire or cable that is free from torsion or torque when it leaves the machine and that has reversely twisted portions throughout its length.

It is to be noted that the tractor chains 50 provide endless means for drawing the wire or cable in a straight line that is in the axis of the twister head and that the pads on the sprocket chains effectively prevent any axial rotation of the strand or strands during their travel through the tractor. The opposed rolls 41 at the discharge end of the twister head also prevent axial turning of the strand or strands as they move axially through the head; and by the use of the longitudinally spaced pairs of rolls 40 and 41 a moving portion will be held in a straight line in alinement with the straight portion moving through the tractor. Due to the strand or strands being thus held against axial turning at these closely spaced points, and the rotation of the twister head, the strand or strands will be twisted between those spaced points to an extent beyond the point of resiliency of the material and hence there will be a permanent distortion of the material, and the twisted sawing wire or cable will be free from torsion or stress as it leaves the tractor.

From the foregoing, taken in connection with the accompanying drawing, it will be seen that novel and advantageous provisions has been made for carrying out the objects of the invention, and while preferences have been disclosed, attention is invited to the possibility of making variations within the scope of the invention as claimed.

I claim:

1. In a machine for producing a twisted stone sawing cable the wires of which are free from torsion, the combination of
   (a) supporting means including a horizontally disposed plate,
   (b) a horizontally disposed hollow shaft rotatably mounted above said plate,
   (c) a rotatable twister head fixed to one end of said shaft and through the axis of which one or more resilient strands may pass,
   (d) strand supply means rotatable with said shaft for supplying a strand or strands through said shaft to said head,
   (e) means on said head for maintaining moving portions of the strand or strands in a straight line and preventing axial turning of the strand or strands, such means including longitudinally spaced pairs of opposed rolls having peripheral grooves shaped to receive the strand or strands,
   (f) a tractor for drawing the strand or strands through said head mounted above said plate in line with the axis of said head, said tractor including a pair of opposed horizontally disposed endless sprocket chains carrying longitudinally spaced gripping pads, the pads on the opposed reaches of said chains being adapted to engage opposite sides of the moving strand or strands to prevent axial turning of the same and to hold the gripped portions in a straight line which is in line with the axis of said twister head, the inlet portions of the opposed reaches of the sprocket chains being closely spaced from the discharge end of said twister head,
   (g) means for driving the opposed reaches of said sprocket chains in the same direction including an upright driving shaft for each chain mounted in bearings on said plate and projecting below the latter,
   (h) a reversible electric motor, (i) a control switch to start and stop said motor and permit its armature shaft to rotate in either direction,
(j) driving means between the motor shaft and said hollow shaft,
(k) a second horizontal shaft parallel with said hollow shaft and supported in bearings beneath said plate,
(l) driving means between said second shaft and said hollow shaft,
(m) a vertical shaft mounted in bearings beneath said plate and disposed adjacent one end of said second shaft,
(n) driving means between said vertical shaft and the projecting lower ends of the two driving shafts of said sprocket chain driving means, and
(o) an automatic reversing mechanism between said vertical shaft and said second shaft, whereby said sprocket chains of the tractor will be driven in the same direction without regard to the direction of rotation of said hollow shaft and its twister head.

2. Apparatus for producing a twisted stone sawing cable the wires of which are free from tension, comprising
a plurality of wire supply reels;
rotatably mounted twister head means including a first pair of parallel relatively adjustable opposed rollers between which the wires from said reels are fed;
means including a reversible electric motor for selectively driving said twister head means in either direction to twist the wires into a cable;
tractor means for drawing the cable through said twister head means, said tractor means having its inlet end immediately adjacent the discharge end of said head and including opposed endless chain means for gripping opposite sides of the cable to hold the gripped portions in a straight line that is in alignment with the axis of the twister head means;
automatic reversing mechanism means driven by said motor during the operation thereof in either direction for driving said tractor means solely in the cable drawing direction;
and means preventing axial turning of the wires as they pass through said twister head means and said tractor means, respectively, comprising a second pair of relatively adjustable opposed rollers connected with said twister head means adjacent the discharge end thereof and between which said wires are fed, said first and second roller pairs being parallel, and means clamping together the rollers of said first and second roller pairs, respectively, in tight engagement with said wires, said means preventing axial turning of the wires including also a pair of relatively adjustable parallel pressure bars for forcing said endless chain means in gripping engagement with the cable, and means clamping together said pressure bars to effect tight engagement of said endless chain means with said cable.

3. Apparatus as defined in claim 2 wherein at least the rolls of said second roll pair contain peripheral grooves shaped to receive said wires and prevent the axial turning thereof.

4. Apparatus as defined in claim 3 wherein the bottoms of said grooves are flat, and further wherein said wires have on their peripheries longitudinally extending flat surface portions in engagement with said groove bottoms, respectively.

5. Apparatus as defined in claim 3 wherein said twister head means includes a rotatably mounted supporting block, a pair of roller carrying members pivotally connected with said block for swinging movement about parallel transversely spaced axes, each of said members carrying one of the rollers of said first and second roller pairs, respectively, said roller clamping means comprising screw means for adjusting said members to vary the pressure of the opposed rolls on opposite sides of the wires.

6. Apparatus as defined in claim 5 wherein said endless chain means includes a pair of endless sprocket chains carrying spaced gripping pads for engaging opposite sides of said cable, respectively, said gripping pads including flat surfaces engagable by said pressure bars, respectively.

References Cited by the Examiner

UNITED STATES PATENTS

| 1,030,426 | 6/1912 | Parsons et al. | 57—166 |
| 1,053,569 | 2/1913 | Cadman | 74—812 |
| 1,904,885 | 4/1933 | Seeley | 57—138 |
| 2,218,104 | 10/1940 | Brignall | 140—149 |
| 2,688,887 | 9/1954 | Lowther | 74—812 |
| 2,724,944 | 11/1955 | Carleton et al. | 57—138 |
| 2,835,283 | 5/1958 | Thone et al. | 140—149 |
| 3,130,536 | 4/1964 | Peterson et al. | 57—161 |

FOREIGN PATENTS

| 570,160 | 2/1959 | Canada. |

CHARLES W. LANHAM, *Primary Examiner.*

L. A. LARSON, *Examiner.*